United States Patent
Anand et al.

(10) Patent No.: US 9,927,281 B1
(45) Date of Patent: Mar. 27, 2018

(54) LEVEL MEASURING DEVICE COMPRISING A RADAR TRANSMITTER AND VISUAL LEVEL GAUGE FOR RADAR TRANSMITTER CALIBRATION, AND METHOD OF USE

(71) Applicant: Bliss Anand America LLC, La Porte, TX (US)

(72) Inventors: Kunal Anand, La Porte, TX (US); Rengacharry Rajan, Delhi (IN)

( * ) Notice: Subject to any disclaimer, the term of this patent is extended or adjusted under 35 U.S.C. 154(b) by 0 days.

(21) Appl. No.: 15/783,213

(22) Filed: Oct. 13, 2017

(51) Int. Cl.
*G01F 23/284* (2006.01)
*G01F 25/00* (2006.01)

(52) U.S. Cl.
CPC ........ *G01F 23/284* (2013.01); *G01F 25/0061* (2013.01)

(58) Field of Classification Search
CPC .... G01F 23/284; G01F 25/0061; G01S 13/88; G01S 13/02
USPC ........................................................ 342/124
See application file for complete search history.

(56) References Cited

U.S. PATENT DOCUMENTS

| | | | | |
|---|---|---|---|---|
| 2002/0026868 | A1* | 3/2002 | English | F15B 1/265 91/196 |
| 2005/0257613 | A1* | 11/2005 | Spencer | G01F 23/02 73/323 |
| 2016/0168933 | A1* | 6/2016 | Aktas | E21B 21/01 166/53 |
| 2016/0290850 | A1* | 10/2016 | Kech | G01F 23/284 |

* cited by examiner

*Primary Examiner* — Timothy A Brainard
(74) *Attorney, Agent, or Firm* — Spradley PLLC; Michael Spradley

(57) ABSTRACT

A level measuring device for radar transmitter calibration, and method of use is herein disclosed. The level measuring device can comprise a radar transmitter, a fluid column, process flanges, and a visible level gauge. The radar transmitter can mount above the fluid column. The fluid column can comprise a chamber capable of holding a fluid. The process flanges can be in fluid connection with the fluid column at a first side of the fluid column. The process flanges can be connectable to a vessel. The visible level gauge can attach to a second side of the fluid column. The visible level gauge can comprise one or more sight glasses that can allow visible light between the chamber and outside the chamber.

16 Claims, 9 Drawing Sheets

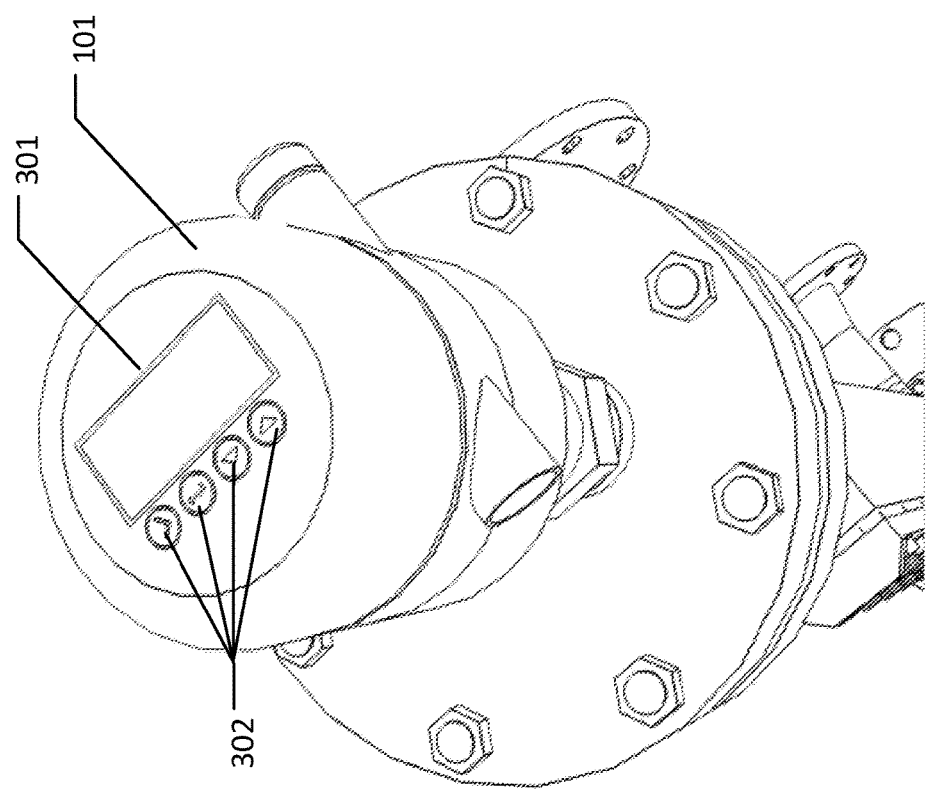

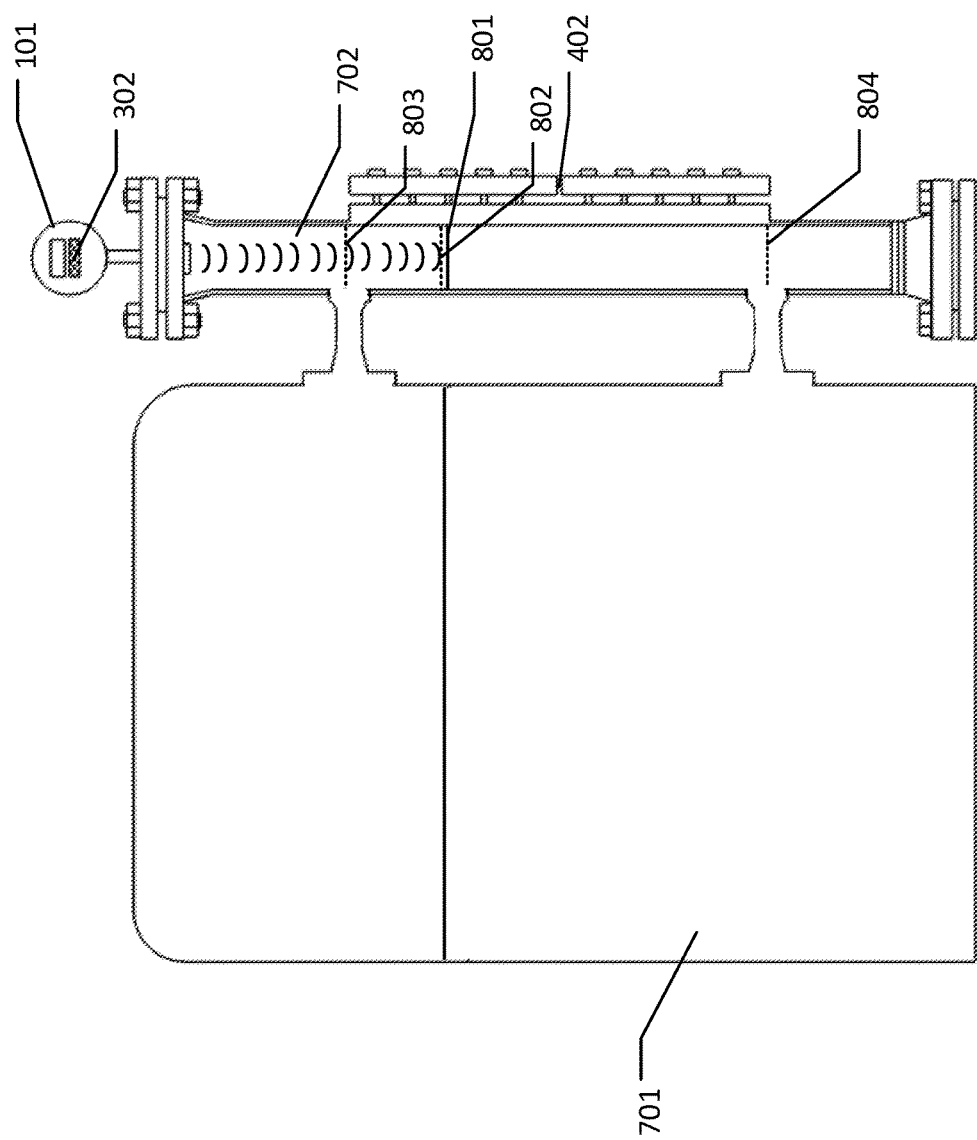

US 9,927,281 B1

LEVEL MEASURING DEVICE COMPRISING A RADAR TRANSMITTER AND VISUAL LEVEL GAUGE FOR RADAR TRANSMITTER CALIBRATION, AND METHOD OF USE

BACKGROUND

This disclosure relates to a level measuring device comprising a radar transmitter and visual level gauge for radar transmitter calibration, and method of use thereof.

Systems and methods for detecting and measuring level of fluids such as fluids and/or fluidized solids have evolved over the years. One known method used is radar level transmitter technology. In this method, a radar level instrument can transmit and receive radio wave signals to measure the distance from the transmitter to the surface of the fluid being processed. Such method of measuring liquids can be highly accurate. Moreover, such method is not affected by temperature, pressure, or dust. Thus, it can be used in many commercial and industrial applications such as flashing applications, foaming applications, and cryogenic applications. Additionally, radar level transmitters can be user-friendly. As such, operator can save time in adjusting configuration of such measuring device. Even though numerous advantages can be observed, such devices require calibration from time to time, and without calibration, faulty readings can occur. Faulty readings present a safety issue because readings are used in automated control systems of potentially dangerous fluids and processes. Presently, the most common way to prevent faulty readings is to periodically take a system offline, remove a radar transmitter, and calibrate the transmitter in a lab. Such process is inefficient, disruptive, and costly.

As such, it would be useful to have a level measuring device comprising a radar transmitter and visual level gauge for radar transmitter calibration, and method of use thereof.

SUMMARY

A level measuring device for radar transmitter calibration, and method of use is herein disclosed. In one embodiment, the level measuring device can comprise a radar transmitter, a fluid column, process flanges, and a visible level gauge. The radar transmitter can mount above the fluid column. The fluid column can comprise a chamber capable of holding a fluid. The process flanges can be in fluid connection with the fluid column at a first side of the fluid column. The process flanges can be connectable to a vessel. The visible level gauge can attach to a second side of the fluid column. The visible level gauge can comprise one or more sight glasses that can allow visible light between the chamber and outside the chamber.

A method for calibrating a radar transmitter is disclosed. The method can comprise the steps of reading a radar level measurement using the radar transmitter, and reading a visible level measurement using a visible level gauge of the level measuring device. The visible level measurement can be taken substantially contemporaneous with the radar level measurement. The method can further comprise the steps of providing the visible level measurement to the radar level measurement and directing the radar transmitter to rescale a level calculation of the radar transmitter so that the radar level measurement can match the visible level measurement.

BRIEF DESCRIPTION OF THE DRAWINGS

FIG. 3 illustrates a radar transmitter further comprising a display and a plurality of buttons.

FIG. 8 illustrates field calibration of a radar transmitter.

DETAILED DESCRIPTION

Described herein is a level measuring device comprising a radar transmitter and sight glass, and method of use thereof. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
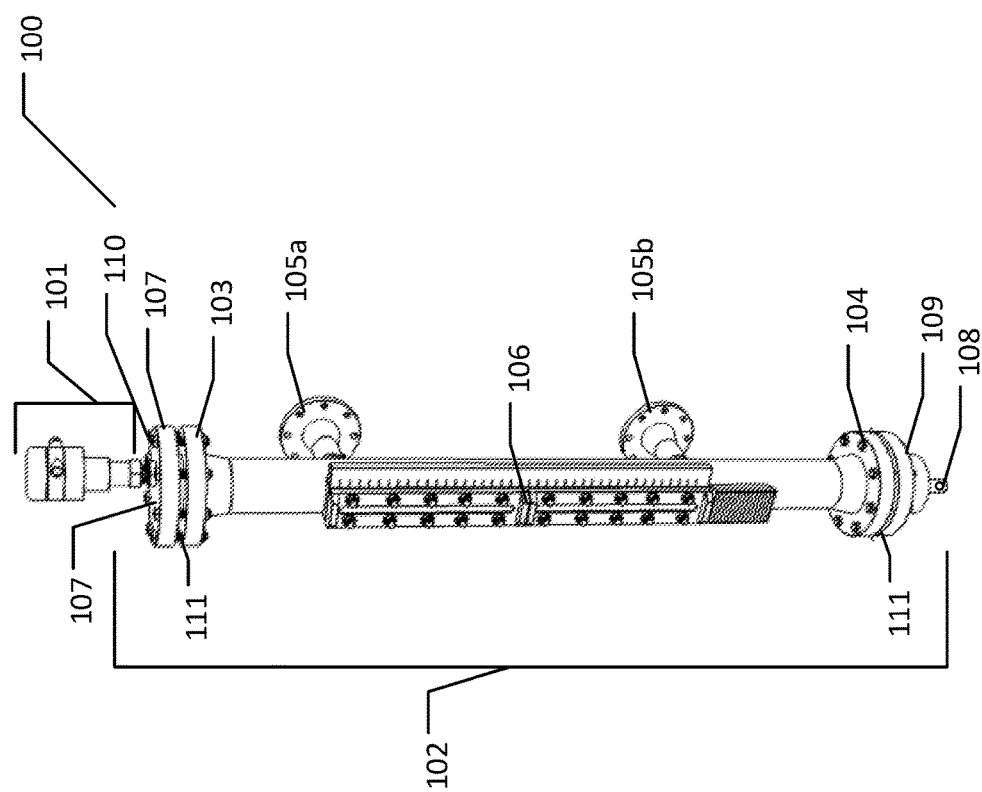
FIG. 1 illustrates a level-measuring device comprising a radar transmitter and a fluid column comprising a forward-facing visible level gauge.

FIG. 1 illustrates a level-measuring device 100 comprising a radar transmitter 101 and a fluid column 102. Level-measuring device 100 can allow reading of a fluid level using a radar transmitter 101 and one or more inbuilt sight glasses, which will be discussed further below. Radar transmitter 101 can detect and measure the level of fluid, such as fluid within a vessel in continuous level measurement applications. Examples of radar transmitter 101 can include a non-contact radar transmitter, contact radar transmitter, or guided-wave radar transmitter. Fluid column 102 can be a hollow pipe that can enclose liquid or substantially liquid fluid. For purposes of this disclosure, the shape of fluid column 102 can be, but is not limited to cylindrical, square, or rectangular. In one embodiment, fluid column 102 can comprise a top column flange 103, a bottom column flange 104, a pair of process flanges 105a and 105b, a visible level gauge 106, a top endcap flange 107, a drain 108, and a bottom endcap flange 109. Top column flange 103 and bottom column flange 104 can be at opposite ends of fluid column 102. Top column flange 103 can be attached at the top portion of fluid column 102, while bottom column flange 104 can be attached at the bottom portion of fluid column 102. Process flanges 105a and 105b can connect to a vessel by bolting or other methods known in the art. Process flanges 105a and 105b can seal the connection between level-measuring device 100 and a vessel. Process flanges 105a and 105b can comprise a top process-flange 105a and a bottom process-flange 105b. In one embodiment, process flanges 105a and 105b can be placed horizontally parallel to each other at a first side of fluid column 102. Furthermore, each process flange 105 can attach perpendicularly at a first side of fluid column 102. In a preferred embodiment, visible level gauge 106 can be mounted to the wall of fluid column 102 such that visible level gauge 106 is an integrated component of fluid column 102, as opposed to being indirectly connected by an intermediary component such as piping. In one embodiment, visible level gauge 106 can be attached at a second side, opposite of the first side and process flanges 105. Visible level gauge 106 can show a true level of liquid within fluid column 102 exactly matching a vessel to which level measuring device 100 is connected, as visible level gauge 106 works using the manometric principle. Radar transmitter 101 can be mounted above fluid column 102. In one embodiment, radar transmitter can mount to top endcap flange 107. Top endcap flange 107 can connect to top column flange 103. Drain 108 can be below fluid column 102. In one embodiment, drain 108 can be mounted within bottom endcap flange 109. Bottom endcap flange 109 can attach to bottom column flange 104. Drain 108 can be used to release fluid within fluid column 102. For purposes of this disclosure, drain 108 can be, but is not limited to a drain plug or drain valve. Flanges can be attached together using fasteners 110 such as bolts, with gaskets 111 between the flanges to form a seal. Gaskets, in one embodiment can be spiral wound.

Figure 2A:
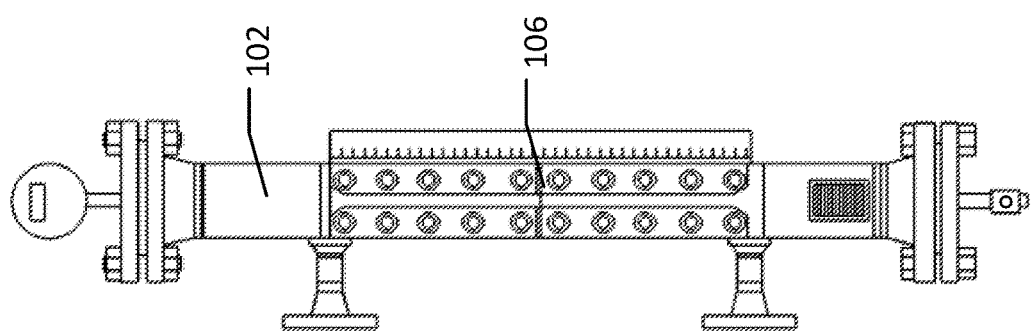
FIG. 2A illustrates a level-measuring device comprising a fluid column comprising a side-facing visible level gauge.

FIG. 2A illustrates a level-measuring device 100 comprising fluid column 102 comprising a side-facing visible level gauge 106. In one embodiment, the second side of fluid column 102 to which visible level gauge 106 is integrated can be approximately 90 degrees from the first side of fluid column 102.

Figure 2B:
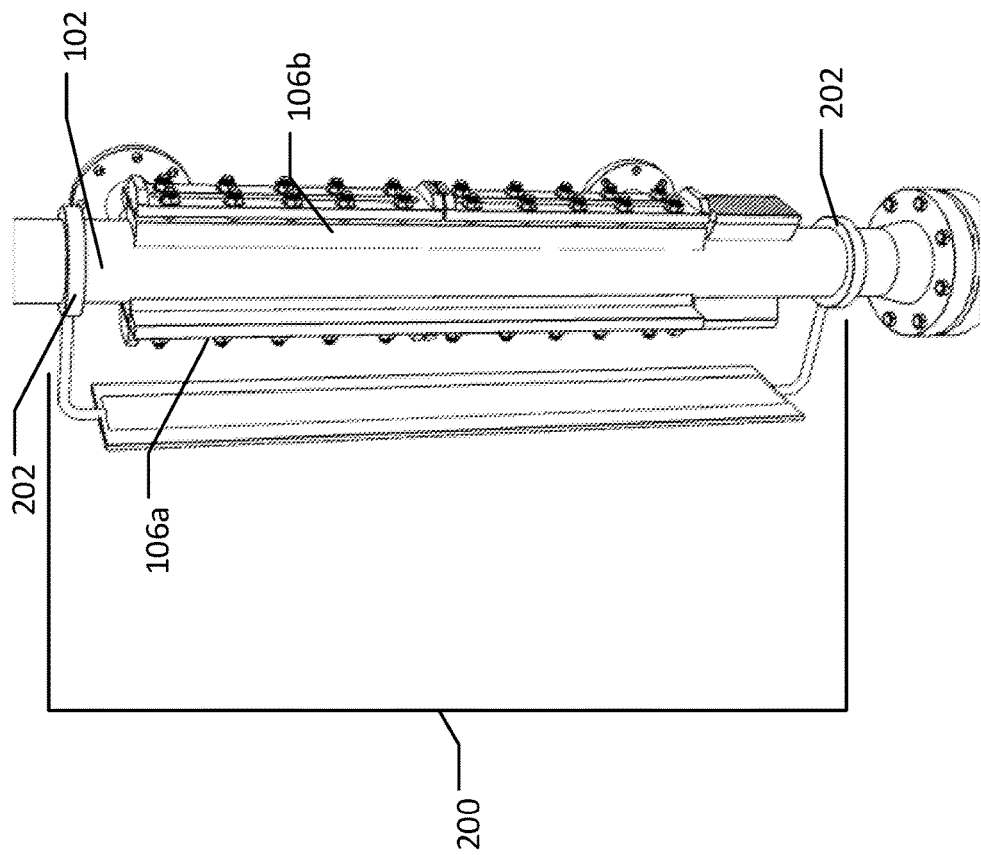
FIG. 2B illustrates an embodiment of a level-measuring device comprising an illuminator.

FIG. 2B illustrates an embodiment of level-measuring device 100 comprising a first visible level gauge 106a, a second visible level gauge 106b and an illuminator 200. In one embodiment, illuminator 200 can be a rectangular light fitting attached in front of first visible level gauge 106a. Illuminator 200 can illuminate through first visible level gauge 106a and through a second visible level gauge 106b, which can allow viewing of fluid level through second visible level gauge 106b to be clearer. Illuminator 200 can be mounted to fluid column 102 with fittings 202. Illuminator 200 can be a light-emitting diode (LED) light, incandescent, or any other light known in the art. Further, in one embodiment, fittings 202 can be pair of clamps attached at the opposite ends of illuminator 200, however, illuminator 200 can be affixed to level measuring device in any method known in the art. In one embodiment, fittings 202 can be at least 180 degrees rotatable, which can allow illuminator 200 to be positioned in front of either first visible level gauge 106a or second visible level gauge 106b.

FIG. 3 illustrates radar transmitter 101 further comprising a display 301, and a plurality of buttons 302. Such display 301 and buttons 302 can allow operator to monitor, calibrate and/or control functions of radar transmitter 101, as will be discussed further below.

Figure 4:
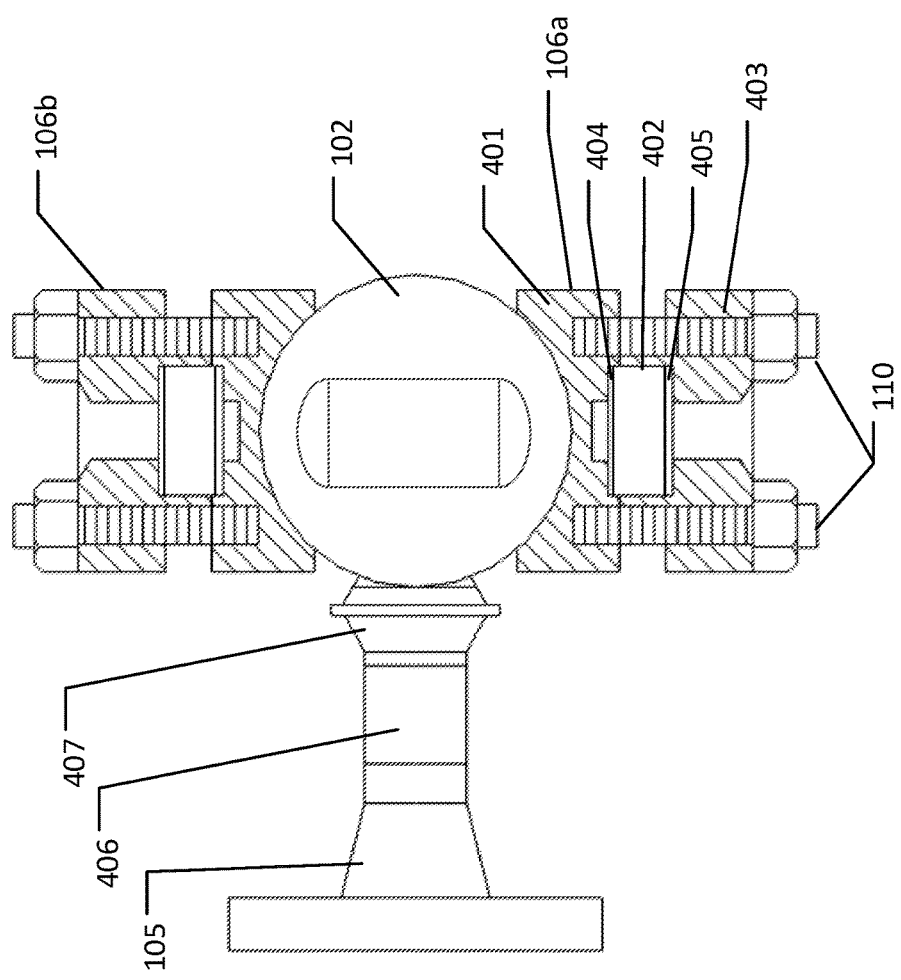
FIG. 4 illustrates a top view of a level-measuring device.

FIG. 4 illustrates a top view of level-measuring device 100 further comprising two visible level gauges 106a and 106b, each visible level gauge 106 comprising a pad 401, one or more sight glasses 402, one or more cover plates 403, a cushion gasket 404, and a wetted gasket 405. Pad 401 can connect visible level gauge 106 with fluid column 102. Sight glass 402 can be a transparent material such as glass within level-measuring device 100. For purposes of this disclosure sight glass need not be glass, but can be any solid transparent material known in the art. Each cover plate 403 can be attached in front of one of the one or more sight glasses 402. Moreover, cover plates 403 can protect and secure sight glasses 402 in place. Cushion gasket 404 can be a type of filler such as a ring or rubber capable of sealing the connection between pad 401 and sight glass 402. Wetted gasket 405 can serve as filler between sight glass 402 and cover plate 403. Cover plate 403, wetted gasket 405, sight glass 402, cushion gasket 404 and pad 401 can be attached together using fasteners 110. Pad 401 and cover plate 403 can ensure that sight glass 402 can be enclosed and protected from scratches and impact. Moreover, such structure can withstand high pressure within level measuring device 100. Each process flange 105 can comprise a nozzle pipe 406, and a branch connection fitting 407. Nozzle pipe 406 can allow flow between a container and level-measuring device 100. Branch connection fitting 407 can connect each process flange 105 to fluid column 102. The opposite ends of branch connection fitting 407 can be beveled and can be designed to minimize stress concentration in the pipe connection point. Further, as a non-limiting embodiment, the distance from the outer surface of process flanges 105 to the cross-section of fluid column 102 can be around 200 millimeters.

Figure 5:
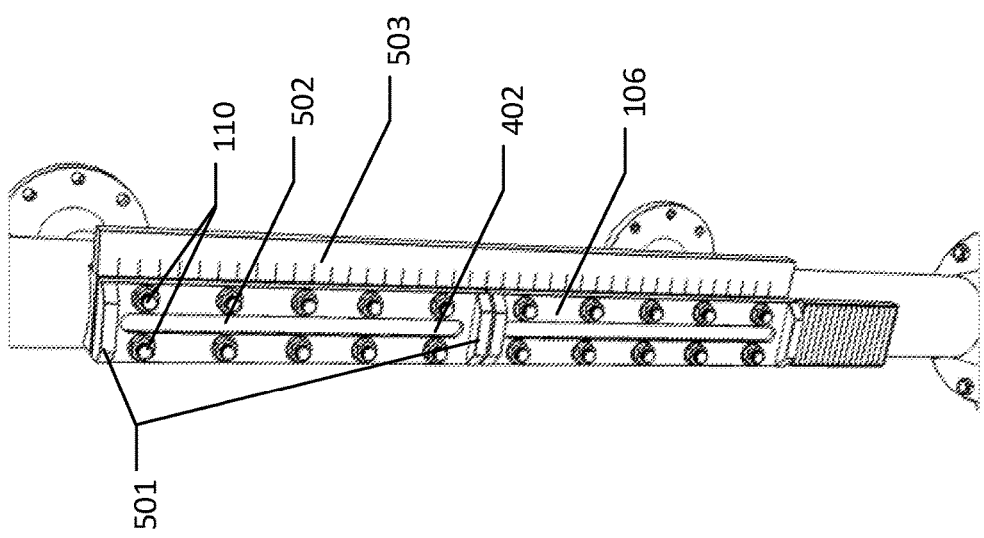
FIG. 5 illustrates a front view of a visible level gauge.

FIG. 5 illustrates a front view of visible level gauge 106 comprising multiple cover plates 403 and sight glasses 402. Each cover plate 403 can cover a top portion of sight glass 402. Each cover plate 403 can comprise a pair of webs 501 and a window 502. Webs 501 can be protruding portions placed at the top-frontend surface, and at the bottom-frontend surface of each cover plate 403, and provide strength to cover plate 403. Window 502 can be an opening at the middle of each cover plate 403. Window 502 can allow operator to see through to sight glass 402. Visible level gauge 106 can further comprise a measuring scale 503. Measuring scale 503 can be vertically attached at a side of cover plate 403. Measuring scale 503 can be used to measure the level of fluid within fluid column 102.

Figure 6:
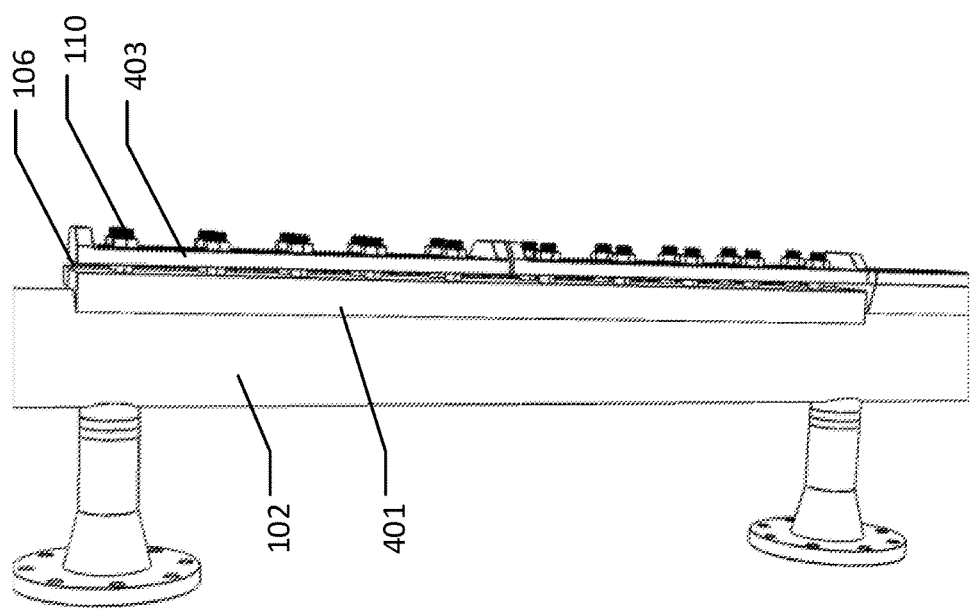
FIG. 6 illustrates a side view of a visible level gauge.

FIG. 6 illustrates a side view of visible level gauge 106 comprising pad 401, and cover plates 403 attached to fluid column 102 using fasteners 110. In one embodiment, pad 401 can be attached to fluid column 102 through method that can include but are not limited to molding, cementing, welding, and/or fastening. In a preferred embodiment, pad 401 is welded to fluid column 102. Cover plates 403 can then be attached to pad 401 using fasteners 110. In such structure, sight glass 402 can be enclosed between pad 401 and cover plates 403. As such, cushion gasket 404 and wetted gasket 405 can act as filler that seals the spaces in between pad 401 and cover plates 403.

Figure 7:
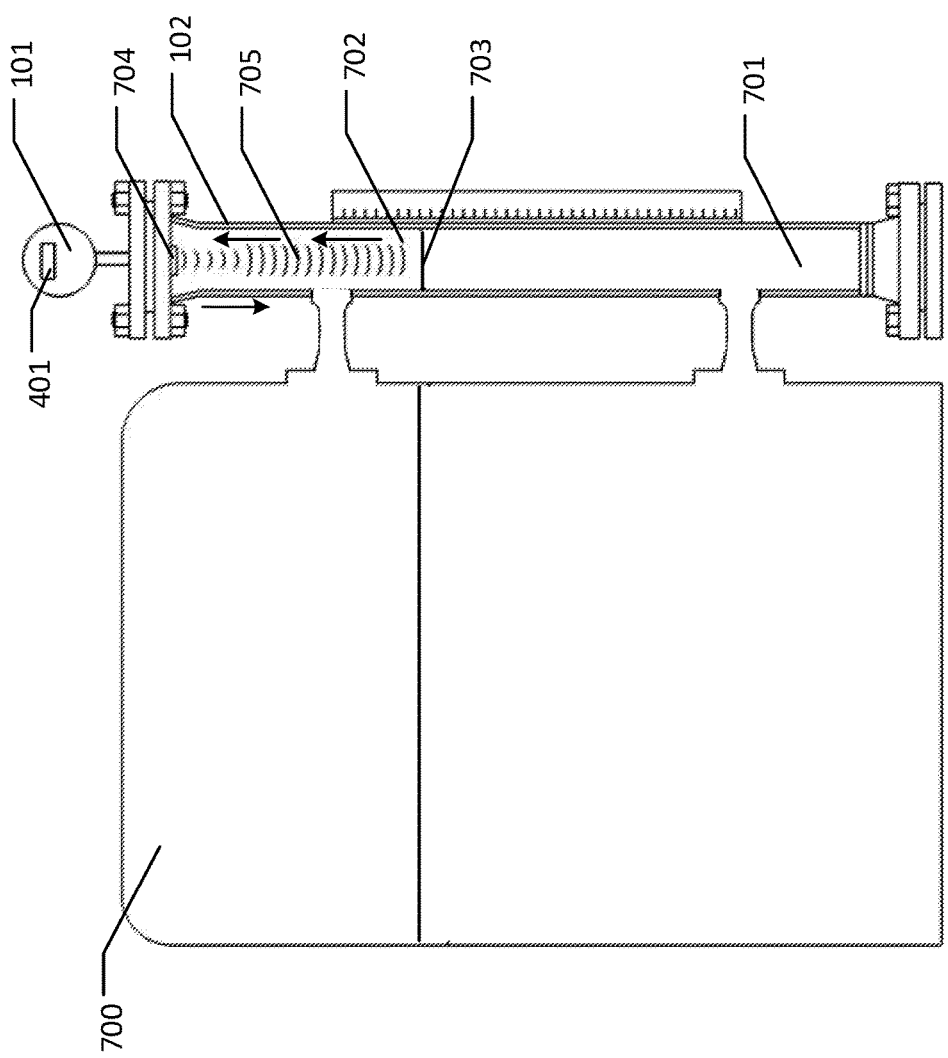
FIG. 7 illustrates a level-measuring device connected to a vessel.

FIG. 7 illustrates level-measuring device 100 connected to a vessel 700. Vessel 700 can be any enclosed device, such as a tank, which can be used to contain fluid 701. Examples of fluid 701 include but are not limited to water, alcohols, acids, petrol, etc. Additionally, vessel 700 can be a boiler drum. Fluid column 102 can comprise a chamber 702 that can be capable of holding fluid 701. A portion of radar transmitter 101, such as a sensor can be positioned at the top portion of chamber 702. Further, level-measuring device 100 can be connected to vessel 700 such that fluid 701 in vessel 700 can have the same level with the fluid within chamber 702.

When chamber 702 is filled with fluid 701, radar transmitter 101 can read the level of fluid 701 by bouncing a wave off a fluid surface 703 within chamber 702. Such wave originates from a sensor's reference point 704. Fluid surface 703 can be the visible surface level of fluid 701. Sensor's reference point 704 can be the starting position where signal 705 of radar transmitter 101 can be transmitted. Signal 705 can be an electromagnetic radiation produced from radar transmitter 101. From sensor's reference point 704, radar transmitter 101 can continuously transmit pulses of signal 705 until it reaches fluid surface 703. After reaching fluid surface 703, signal 705 can reflect back to radar transmitter 101. Then, radar transmitter 101 can measure the time of flight of the travelling radio wave (or signal 705) to determine the measure of fluid 701 within chamber 702. A receiver on radar transmitter 101 can then convert signal 705 into a measurement that can be converted and shown on display 301 or communicated over a network connected to radar transmitter 101.

FIG. 8 illustrates pre-calibration and field calibration of radar transmitter 101. Level-measuring device 100 can have a visible read level 801 and radar read level 802. Visible read level 801 can be the level of fluid 701 within chamber 702 that can be seen through sight glass 402. Moreover, sight glass 402 can allow operator to see the real-time level of fluid 701. Further, radar read level 802 can be the measurement result of radar transmitter 101, which can be based from the entered parameters during pre-calibration, such as a calibration performed in a lab before commissioning of radar transmitter 101. Using sight glass 402, an operator can perform a field calibration in the following manner. First, visible read level 801 and radar read level 802 can both be taken substantially simultaneously. In cases wherein read level 802 and visible read level 801 do not match, the operator can adjust the radar transmitter's parameters using buttons 302 at the surface of radar transmitter 101. In one embodiment, the operator can correct the accuracy of radar transmitter 101 by providing visible read level 801 to radar transmitter 101. Then the radar transmitter can be directed through user command or preprogramming to rescale a level calculation of radar transmitter 101 so that radar read level 802 matches visible read level 801.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method for calibrating a radar transmitter comprising the steps of reading a radar level measurement using a radar transmitter;

reading a visible level measurement using a visible level gauge of a level measuring device, said visible level measurement taken substantially contemporaneous with said radar level measurement;

providing said visible level measurement to said radar level measurement; and directing said radar transmitter to rescale a level calculation of said radar transmitter so that said radar level measurement matches said visible level measurement.

2. The method of claim 1 wherein said visible level gauge comprises a first sight glass mounted to a first side of a fluid column, further wherein reading said visible level measurement comprises looking through said first sight glass to see a fluid level within said fluid column.

3. The method of claim 2 wherein said visible level gauge comprises a second sight glass mounted to a second side of said fluid column.

4. The method of claim 3 wherein said fluid is illuminated at least in part by visible light passing though said second sight glass into said fluid column.

5. The method of claim 4 wherein an illuminator is affixed to said level measuring device in a first position in front of said second sight glass, said visible light from said illuminator.

6. The method of claim 5 wherein said illuminator is affixed to said level measuring devices such that said illuminator is rotatable, further comprising the step of rotating said illuminator from said first position to a second position in front of said first sight glass.

7. The method of claim 4 wherein said second side is opposite said first side.

8. The method of claim 1 wherein directing said radar transmitter to rescale said level calculation of said radar transmitter is performed using a user command.

9. The method of claim 1 wherein directing said radar transmitter to rescale said level calculation of said radar transmitter is performed using preprogramming.

10. The method of claim 1 further comprising the step of draining fluid from said level measuring device using a drain mounted to said level measuring device.

11. The method of claim 10 wherein said drain is a drain plug.

12. The method of claim 10 wherein said drain is a drain valve.

13. The method of claim 1 wherein said radar transmitter is a non-contact radar transmitter.

14. The method of claim 1 wherein said radar transmitter is a contact radar transmitter.

15. The method of claim 1 wherein said radar transmitter is a guided wave radar transmitter.

16. The method of claim 1 wherein reading a visible level measurement comprising using a measuring scale to measure a fluid level within a fluid column.

* * * * *